United States Patent
Sekar (10) Patent No.: US 10,596,749 B2
(45) Date of Patent: *Mar. 24, 2020

(54) SYSTEM AND METHOD FOR PERFORATING PAINT-ROLLER COVER FABRIC

(71) Applicant: Chandra Sekar, Albertson, NY (US)

(72) Inventor: Chandra Sekar, Albertson, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,550

(22) Filed: Aug. 14, 2018

(65) Prior Publication Data

US 2019/0070773 A1 Mar. 7, 2019

Related U.S. Application Data (63) Continuation-in-part of application No. 15/968,476, filed on May 1, 2018, which is a continuation of
(Continued)

(51) Int. Cl.
*B29C 53/60* (2006.01)
*D06B 1/14* (2006.01)
(Continued)

(52) U.S. Cl.
CPC ........ *B29C 53/607* (2013.01); *B29C 48/0022* (2019.02); *B29C 48/09* (2019.02); *B29C 48/154* (2019.02); *B29C 53/566* (2013.01); *B29C 53/581* (2013.01); *B29C 53/60* (2013.01); *B29C 53/8083* (2013.01); *B29C 53/827* (2013.01); *D06B 1/14* (2013.01); *B05C 17/0207* (2013.01); *B29C 66/02242* (2013.01);
(Continued)

(58) Field of Classification Search
CPC .......... B29L 2031/328; B05C 17/0207; B29C 53/58; B29C 53/581; B29C 53/60; B29C 2793/0045; B29C 66/02242; Y10T 156/1056; B26F 1/00; B26F 1/02; B26F 1/10; B26F 1/24
See application file for complete search history.

(56) References Cited

U.S. PATENT DOCUMENTS

2002/0066521 A1* 6/2002 Sekar ................. B05C 17/0207
156/187
2002/0139228 A1* 10/2002 Johnston ................. B26D 7/08
83/13

(Continued)

*Primary Examiner* — Carson Gross
(74) *Attorney, Agent, or Firm* — Beusse, Wolter, Sanks & Maire PLLC; Robert L. Wolter (57) ABSTRACT

In an embodiment, a paint roller manufacturing system and method uses a fabric-coating applicator to apply a fabric adhesive onto a portion of a perforated paint roller cover fabric material having a plurality of perforations through which adhesive may flow, and into the plurality of perforations and into interstitial spaces of the fabric material, to yield a length of coated fabric. An inner strip and an outer strip are wound about a mandrel in offset relation. A strip-coating applicator is used to apply a strip adhesive to the outer strip as it is wound about the mandrel. Simultaneously with the step of applying the strip adhesive to the outer strip, a portion of the coated paint roller fabric material is received at the outer strip and the length of coated fabric is wound about at least the outer strip to form a paint roller tube.

10 Claims, 6 Drawing Sheets

Related U.S. Application Data application No. 15/676,507, filed on Aug. 14, 2017, now Pat. No. 9,956,719.

(51) Int. Cl.
    *B29C 53/82*         (2006.01)
    *B29C 53/80*         (2006.01)
    *B29C 53/58*         (2006.01)
    *B29C 48/09*         (2019.01)
    *B29C 53/56*         (2006.01)
    *B29C 48/154*       (2019.01)
    *B29C 48/00*         (2019.01)
    *B29L 31/32*         (2006.01)
    *B29C 65/00*         (2006.01)
    *B05C 17/02*         (2006.01)
    *B32B 1/08*          (2006.01)
    *B29K 23/00*        (2006.01)

(52) U.S. Cl.
    CPC ............... *B29C 66/30325* (2013.01); *B29C 2053/8025* (2013.01); *B29C 2793/009* (2013.01); *B29C 2793/0027* (2013.01); *B29C 2793/0045* (2013.01); *B29C 2793/0081* (2013.01); *B29K 2023/12* (2013.01); *B29L 2031/328* (2013.01); *B32B 1/08* (2013.01); *B32B 2597/00* (2013.01); *Y10T 156/1056* (2015.01); *Y10T 156/1057* (2015.01)

(56) References Cited

U.S. PATENT DOCUMENTS

2010/0170630 A1*   7/2010  Sekar .................. B26D 1/035
                                                        156/187
2010/0282400 A1*  11/2010  Sekar .................. B29C 53/581
                                                        156/187

\* cited by examiner

SYSTEM AND METHOD FOR PERFORATING PAINT-ROLLER COVER FABRIC

This application is a continuation-in-part of U.S. patent application Ser. No. 15/968,476 filed May 1, 2018, which is a continuation of U.S. patent application Ser. No. 15/676,507 filed Aug. 14, 2017, the entire disclosures of which are incorporated herein by reference.

FIELD

The present invention relates in general to the field of paint roller manufacturing, and in particular to a novel machine and process for using a perforated fabric in a process for manufacturing paint rollers.

BRIEF DESCRIPTION OF THE DRAWINGS

Objects, features, and advantages of the invention will be apparent from the following description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Figure 1:
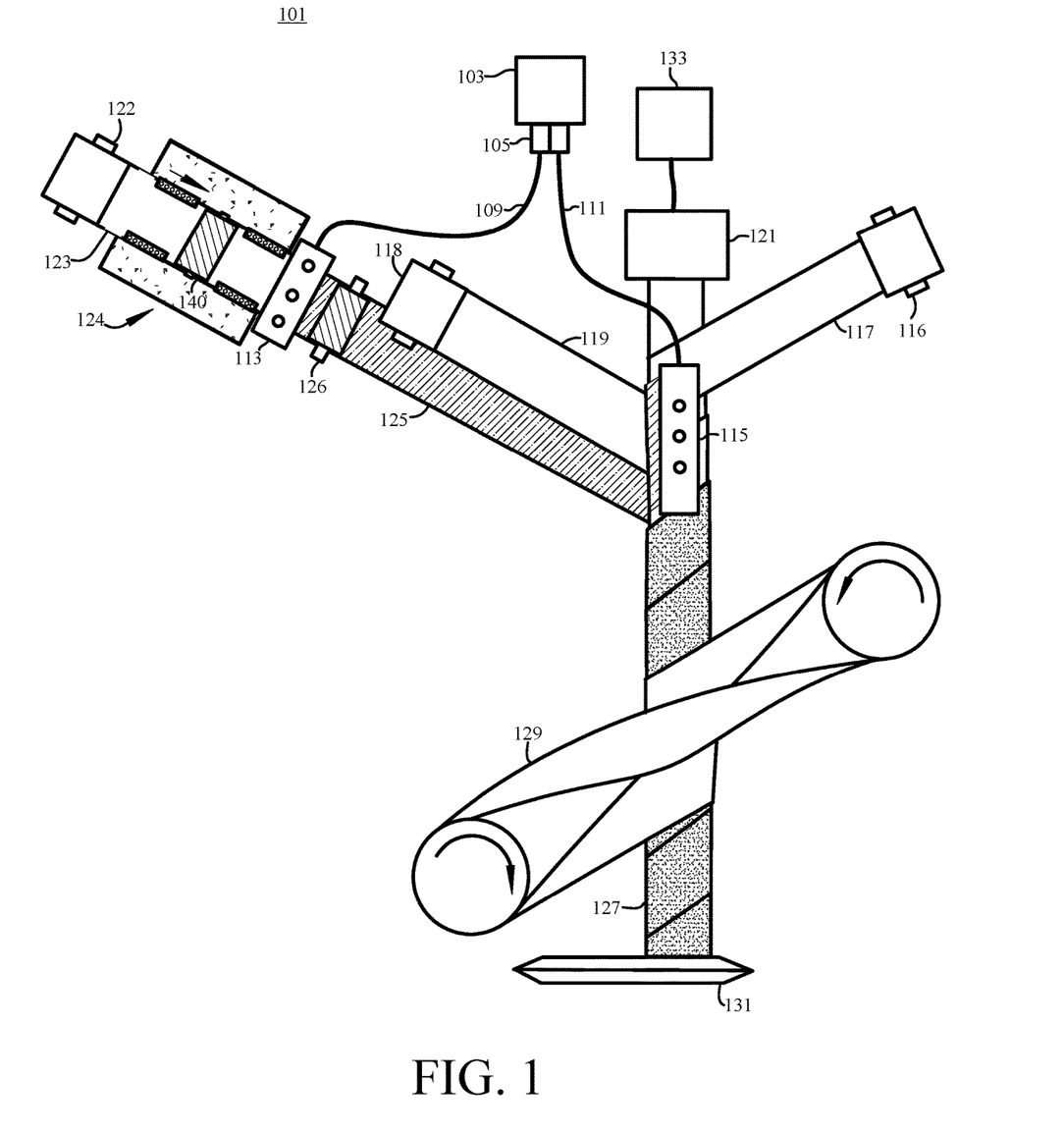
FIG. 1 shows a top view illustrating a machine and process for manufacturing paint rollers in accordance with an embodiment wherein a single extruder is used to feed two applicators in a two-strip process.

The machine and process may be configured to use a fabric cover that has been pre-perforated offline at a separate facility from the paint roller manufacturing facility, or can be configured to perforate the fabric inline with the paint roller manufacturing process. With reference to FIG. 1, a paint roller manufacturing system 101 and process for manufacturing paint rollers in accordance with an embodiment are illustrated. The paint roller manufacturing system 101 includes a cover dispenser 122 continuously dispenses a windable width of paint roller cover fabric, the paint roller cover fabric having a back side and an applicator side. A fabric supporting and advancing device 124 may be provided to support the fabric and maintaining a width-wise dimension of the paint roller cover fabric as the fabric advances, back side up, across the fabric supporting device.

A fabric coating applicator 113 is configured to apply a coating to the back of the paint roller cover fabric. The fabric coating applicator may be part of a machine at a separate facility from the paint roller manufacturing facility or may be associated with the paint roller manufacturing machine and process, as shown. The fabric coating applicator is positioned to apply the coating to the back of the paint roller cover fabric while the fabric is supported by the fabric supporting and advancing device 124. It should be noted that the coating is applied to the back of the fabric, whether the fabric already has a backing or whether the present process creates a backing by virtue of applying a coating to the back of uncoated fabric. The fabric coating applicator may be configured to apply a contiguous or non-contiguous coat of material to the paint roller cover material. Examples of a non-contiguous coat include, without limitation, stripes of coating material. In addition, the fabric coating application may be configured to apply additional material, such as a mesh material, to the fabric back side, in addition to a coating material. In an embodiment, a mesh material and a contiguous coat of material are applied to the paint roller cover material by the fabric coating applicator. In an embodiment, a mesh material and a non-contiguous coat of material are applied to the paint roller cover material by the fabric coating applicator. A compressing roller 126 is positioned downstream of the fabric coating applicator and configured to apply a compressive force on the coating after it has been applied to the back side of the paint roller cover fabric. In an embodiment, the compressing roller 126 is positioned to provide the compressive force upon the coating while the fabric is supported by the fabric supporting and advancing device. In an embodiment, the compressing roller 126 is positioned to provide the compressive force upon the coating downstream of the location where the fabric is supported by the fabric supporting and advancing device. In an embodiment, the fabric supporting and advancing device 124 is inclined downward toward the compressing roller 126 at an angle of, e.g., 45 degrees. In an embodiment, the angle of the fabric supporting device 124 is between 30 and 60 degrees. In an embodiment, the angle of the fabric supporting device 124 is between 20 and 80 degrees. In an embodiment, the fabric supporting and advancing device 124 is inclined upward toward the compressing roller 126. In an embodiment, the compressing roller 126 is configured with the aid of one or more additional rollers or surfaces (not shown) to provide the compressive force upon the coating downstream of the area where the fabric is supported by the fabric supporting and advancing device. In an embodiment, a belt (not shown) between two or more rollers can be used as such a surface (in this case, a curved surface), as an aid to the compressing roller, permitting the compressive force to be applied across a larger portion of the compressing roller 126.

A mandrel 121 is provided, and may be cooled by a mandrel cooler 133 so as to facilitate movement of strips around the mandrel in a helical manner without adhesion of the strips to the mandrel and with lower resistance.

First and second strip dispensers 116, 118 are configured to continuously dispense first and second windable widths of strip material 117, 119. A guide system (not shown) may be used to guide the first and second strip coming from the first and second strip dispensers such that it is wound about the mandrel and to guide the coated paint roller cover fabric from the fabric supporting device to be wound about the first and second strips 117, 119. The second strip 119 and/or the first strip 117 may be a solid strip, a perforated strip or an embossed strip (e.g., having recessed dimples).

An adhesive applicator 115 is configured to apply adhesive (which may be glue, a polymer, or a compound polymer) on substantially all of the outer side of the first and second windable strips 117, 119 upstream of a location where the coated paint roller cover fabric 125 is wound about the first and second strips.

A compressing and advancing device 129 is provided for applying inward pressure normal to the mandrel on the coated paint roller fabric cover 125 after it is wound about the first and second strips 117, 119, and for advancing the first and second windable strips and the coated paint roller fabric cover along the mandrel 121.

In an embodiment, the machine includes an extruder 103, which may be configured for extrusion of an adhesive material through a Y-Adapter 105. In an embodiment, the material is molten when it is extruded through the Y-Adapter 105. In an embodiment, the molten material is pushed through hoses 109 and 111 to the fabric-coating applicator 113 and the strip-coating adhesive applicator 115, respectively. The fabric-coating applicator 113 and/or the strip-coating applicator 115 may comprise any device for applying liquid adhesive to a fabric, including a die head, sprayer, brush, extruder, or the like.

The inner strip 117 and outer strip 119 of material are helically wound about the mandrel 121 in offset relation. In an embodiment, the offset relation is approximately 50%, that is, that the center of one strip wraps at a location under or over (as the case may be) the middle of the other strip. In an embodiment, the offset relation is at least 5% to prevent the seams of the inner strip and the outer strip from aligning. A 5% offset relation refers to having the seam at least 5% of the width of the strip away from the edge of the strip. In an embodiment, the entire inner surface of the inner strip 117 contacts the mandrel 121. In an embodiment, no portion of the outer strip 119 contacts the mandrel 121.

The inner strip 117 and the outer strip 119 may comprise any material that is flexible so as to be helically wound about the mandrel. In an embodiment, the strips comprise polypropylene. In an embodiment, the strips comprise a compound of polypropylene and calcium carbonate. A variety of formulations for strips may be found, e.g., in Applicant's U.S. patent application Ser. No. 14/789,723 filed Jul. 1, 2015 and the references cited therein, the entire disclosures of which are incorporated herein by reference. The resin that is extruded onto the fabric may comprise, for example, (1) commonly-available polypropylene, (2) a blend of polypropylene, with an effective Melt Flow Rate (MFR) of 20-140 g/10 min., (3) a combination of Calcium Carbonate ($CaCO_3$) and Polypropylene, with $CaCO_3$ ranges used from 10-66% $CaCO_3$, or (4) a combination of Calcium Carbonate and blend of polypropylene (having a high MFR ranging from 700-1400 g/10 min), with $CaCO_3$ ranges from 10-66% $CaCO_3$ by weight, for an effective total MFR of 20-140 g/10 min.

In an embodiment, the outer surface of the inner strip 117 and the outer surface of the outer strip 119 are coated with adhesive by the strip-coating applicator 115. In an embodiment (not shown), the strip-coating applicator 115 comprises two separate strip-coating applicators, one to coat each of the two strips 117, 119. Thus, such coating of the outside of each of the two strips may be performed by the same applicator or, in another embodiment, by two separate applicators. As shown in FIG. 1, coating of the strip or strips is performed by a single applicator. In an embodiment, only the outer surface of the inner strip 117 is coated with adhesive by the strip-coating applicator 115. In an embodiment, the strip-coating applicator 115 applies adhesive to either the outer surface of the inner strip or the inner surface of the outer strip such that the adhesive ends out between the inner and outer strips after it is applied. In an embodiment, the strip-coating applicator 115 applies adhesive to either the outer surface of the inner strip or the inner surface of the outer strip such that the adhesive ends out between the inner and outer strips after it is applied, and the liquid adhesive applied by the fabric coating applicator 113 is not set when the outer strip 119 and the coated fabric cover 125 come together on the mandrel. In an embodiment, the strip-coating applicator 115 applies adhesive to either the outer surface of the outer strip or the inner surface of the coated fabric 125 such that the adhesive ends out between the outer strip and coated fabric after it is applied. In an embodiment, a portion of the outer surface (rather than the entire outer surface) of the outer strip 119 (or the only strip in a single-strip embodiment) is coated. In an embodiment, the entire outer surface of the outer strip 119 is coated. The strip-coating applicator 115, in each case, may be configured to apply a contiguous or non-contiguous coat of material to the strip. Examples of a non-contiguous coat include, without limitation, a mesh of material, stripes of coating material. In addition, the strip-coating application may be configured to apply additional material, such as a mesh material in addition to a coating material. In an embodiment, a mesh material and a contiguous coat of material are applied by the strip coating applicator 115. In an embodiment, the mesh material is a resin mesh. In an embodiment, only a portion of the outer surface of the inner strip 117 is coated. In an embodiment, the entire outer surface of the inner strip 117 is coated.

In an embodiment, cover fabric material 123 is fed through a fabric supporting and advancing device 124. The fabric supporting and advancing device 124 may optionally comprise a stretching device such as a tenter frame where the fabric is stretched (by, e.g., a series of successively wider spaced pins) in the machine direction, and/or the lateral direction, so as to open up interstitial spaces between fibers of the fabric. The fabric supporting and advancing device 124 may be configured to maintain a lengthwise and/or a widthwise dimension of the fabric for at least a portion of the time the fabric is supported by the device. In an embodiment, the lengthwise and/or widthwise dimension of the fabric are stretched dimensions—that is, larger than the fabric's original dimensions. In an embodiment, the lengthwise and/or widthwise dimension of the fabric are unstretched dimensions. In an embodiment, the fabric material 123 is then fed under or through the fabric-coating applicator 113 where it is coated with fabric adhesive. In an embodiment, fabric material 123 is then fed under or through the fabric-coating applicator 113 while one or more of its dimensions are being maintained by the fabric supporting and advancing device 124. In an embodiment, the adhesive is reactive (e.g., thermally reactive) with the cover material in the sense that an unsupported fabric material would change dimension upon the adhesive application. In an embodiment, the fabric supporting and advancing device 124 resists that reaction, and maintains the fabric dimensionally. In an embodiment, by resisting the reaction, the fabric supporting and advancing device 124 permits more adhesive to fill the interstitial spaces in the fabric. In an embodiment, by resisting the reaction, the fabric supporting and advancing device 124 creates larger interstitial spaces in the fabric into which adhesive may flow. In an embodiment, the application of adhesive while the fabric is dimensionally maintained (e.g., stretched or unstretched) will permit additional molten adhesive to enter the fabric pores, and thus lock down paint roller fabric fibers that are otherwise known to shed, and thus, reduce shedding in a paint roller made by this process.

A perforation roller 140 is configured to make perforations in the fabric and thus create spaces through which adhesive may flow. In an embodiment, the perforation roller 140 comprises a plurality of spaced perforators, which may comprise perforating pins, that can perforate the fabric and thus create spaces (e.g., pores) through which adhesive may flow. In an embodiment, the perforators are sharp at a distal end (away from the perforation roller) and are configured so that they can extend through the backing layer of the fabric. Several factors should be considered in order to provide adequate penetration of the adhesive into the fabric. The thickness of most paint roller fabric backing is roughly 0.30" to 0.50". In an embodiment, the machine, adhesive, and process are designed so that the adhesive penetrates the fabric by that amount, and not more. It is generally desirable for the resin to pass through the backing and to help the fibers adhere to the resin and to the rest of the fabric backing.

In an embodiment, the perforators on the perforating roller are wider-diameter pins than are typically used for hot perforation. In an embodiment, perforating pins with a diameter of 0.010" to 0.018" are used. Perforators having diameters ranging from 0.06" to 0.08" may not provide an adequately large area for resin to penetrate through the fabric backing described above. The pin heads can have shallow or deep tapers, but the perforating diameter should preferably remain the same. In an embodiment, the pins are located 0.12"-0.24" from each other horizontally, point-to-point, and 0.16"-0.24" mm vertically, point to point.

In an embodiment, the fabric passes under the perforating roller with its backing facing the perforating roller and the fabric is supported by a pressure roller as it is passing under the perforating roller. The pressure roller can be made from a number of materials, such as silicone, or densely-packed tampico fibers.

In an embodiment, the perforating roller is heated to provide improved perforation of the fabric backing and processing of the fabric. The temperatures most suitable for penetration range from 360 F to 450 F, although the temperature used may depend on the type of fabric being perforated. Internal resistance heaters can be used, since area heaters may burn the fibers of the fabric.

In order to ensure that the resin used to coat the back of the fabric sufficiently penetrates the fabric backing and makes contact with the fibers, a free-flowing resin should be used. In an embodiment, compounded polypropylene resins that have effective (final, after any compounding) melt flow rate (MFR) ranges of 100-400 g/10 min are used. In an embodiment, compounded polypropylene resins that have effective MFR ranges of 120-220 g/10 min are used. In an embodiment, compounded polypropylene resins that have effective MFR ranges of 130-180 g/10 min are used. It is possible to use lower MFR resins if they are not compounded with filler material, or higher MFR resins if using compounded material with a larger percentage of filler, or with fillers that greatly increase the viscosity of the compounded resin. Thus, in an embodiment, an uncompounded resin with an effective MFR of 20-140 g/10 min is used. In an embodiment, a resin compounded with a large percentage of filler (greater than 50% by weight) with an effective MFR of 140-400 g/10 min is used. The filler may comprise, e.g., calcium carbonate.

In an embodiment, the perforators are configured so that they can extend through the backing layer of the fabric and create spaces or pores therein. In an embodiment, the spaces or pores created in the backing are generally evenly spaced. In an embodiment, the spaces or pores created in the backing are generally evenly spaced by between ⅛" and ¼" on center. In an embodiment, the spaces or pores are of sufficient size to permit adhesive to enter and thus lock the paint roller fibers on setting. In an embodiment, the spaces or pores are between 1/32" and 3/32" across. In an embodiment, the spaces or pores are at least 1/64" across. In an embodiment, the spaces or pores are no more than 1/16" across. In an embodiment, the spaces or pores are no more than 7/64" across. In an embodiment, the spaces or pores are generally round in shape or generally square in shape or generally triangular in shape. In an embodiment, the perforation roller 140 engages the fabric as it is being dimensionally maintained by the fabric supporting and advancing device 124. In an embodiment, the perforation roller 140 comprises a plurality of spaced perforators that do not actually perforate the fabric, but rather, merely push the yarns of the fabric aside and thus create spaces through which adhesive may flow. This is especially useful on knit fabric. In an embodiment, a perforation roller may be provided that is not part of the fabric supporting and advancing device 124, but is instead, upstream or downstream of it. In an embodiment, the perforation roller is upstream of the fabric-coating applicator 113. In an embodiment, perforators that are not in roller form are used to perforate or rearrange yarns on the fabric backing (e.g., to create pores) into which adhesive can enter when applied by the fabric-coating applicator 113.

In an embodiment, the fabric material 123 is fed under or through the fabric-coating applicator 113 while it continues to be stretched. In an embodiment, a compressive force (e.g., by compressing roller 126) is thereafter applied. In an embodiment, a compressive force (e.g., by compressing roller 126) is applied before the adhesive has set. In an embodiment, the adhesive used sets by cooling (e.g., a molten polymer) and the compressing roller 126 aids in cooling the adhesive, and thus aids in the setting process. In an embodiment, the compressing roller 126 is maintained at a temperature lower than that of the adhesive. In an embodiment, the compressing roller 126 is cooled to aid in the setting process. In an embodiment, the compressing roller 126 is maintained at a temperature at or near that of the adhesive to prevent the compressing roller 126 from causing the adhesive to set, and permitting the adhesive to continue unset for a longer period during the manufacturing process (e.g., until it makes contact with the outer surface of the outer strip 119. The coated fabric 125 is then wrapped around the outer surface of the outer strip 119.

In an embodiment, glue may be applied on the back of the cover fabric material 123 as a bonding agent prior to its use in the above-described process. Optionally, glue may be applied on the back of the cover fabric material 123 by the fabric coating applicator 113 as a bonding agent, in addition to the fabric adhesive applied. In an embodiment, glue may be applied on the back of the cover fabric material 123 by the fabric coating applicator 113 as the fabric adhesive. Glue may be applied by a hot melt machine, dripped on the back of the fabric using a slot die, or by any other known application method.

The formed (but potentially still setting) paint roller cover material tube 127 may be driven by a motorized compressing and advancing device 129, which may comprise a belt. The formed paint roller cover material tube 127 may be advanced to a flyaway saw 131, which cuts the tube into lengths. In an embodiment, the lengths of tube may be further cut into lengths used as a paint roller. In an embodiment, the lengths of tube cut by the flyaway saw 131 or as further cut, are finished prior to use as a paint roller.

In an embodiment, the fabric-coating applicator 113 and the strip-coating applicator 115 comprise two sheet dies, each having a width appropriate for coating the subject, as described herein. In an embodiment, the fabric coating applicator has a sheet die sufficient to cover all, or substantially all of the backing of the fabric. In an embodiment, the fabric coating applicator has a sheet die wider than the backing of the fabric. In an embodiment, the advancing coated fabric 125 is trimmed as it advances towards the mandrel to remove excess coating.

In an embodiment, the fabric-coating applicator 113 and the strip-coating applicator 115 comprise two sheet dies, both being 10.5 inches in width. In an embodiment, both dies are between 8 and 13 inches in width. In an embodiment, the fabric-coating applicator die is 3.5 inches in width and the strip-coating applicator die is 10.5 inches in width. In an embodiment, the width of the fabric-coating applicator die is between 2 and 5 inches. In an embodiment, the width of the strip-coating applicator die is between 8 and 13 inches. In an embodiment, the die of the strip-coating applicator has a 0.040 inch wide die gap, and the die of the fabric-coating applicator has a 0.025 inch wide die gap. In an embodiment, the die of the strip-coating applicator has a die gap that is between 0.025 and 0.055 inches in width. In an embodiment, the die of the fabric-coating applicator has a die gap that is between 0.010 and 0.040 inches in width. In an embodiment used to make mini rollers, the width of the strip-coating applicator die is between 3 inches and 4.5 inches, and the width of the fabric strip is between 1 inch and 1.5 inch.

Figure 2:
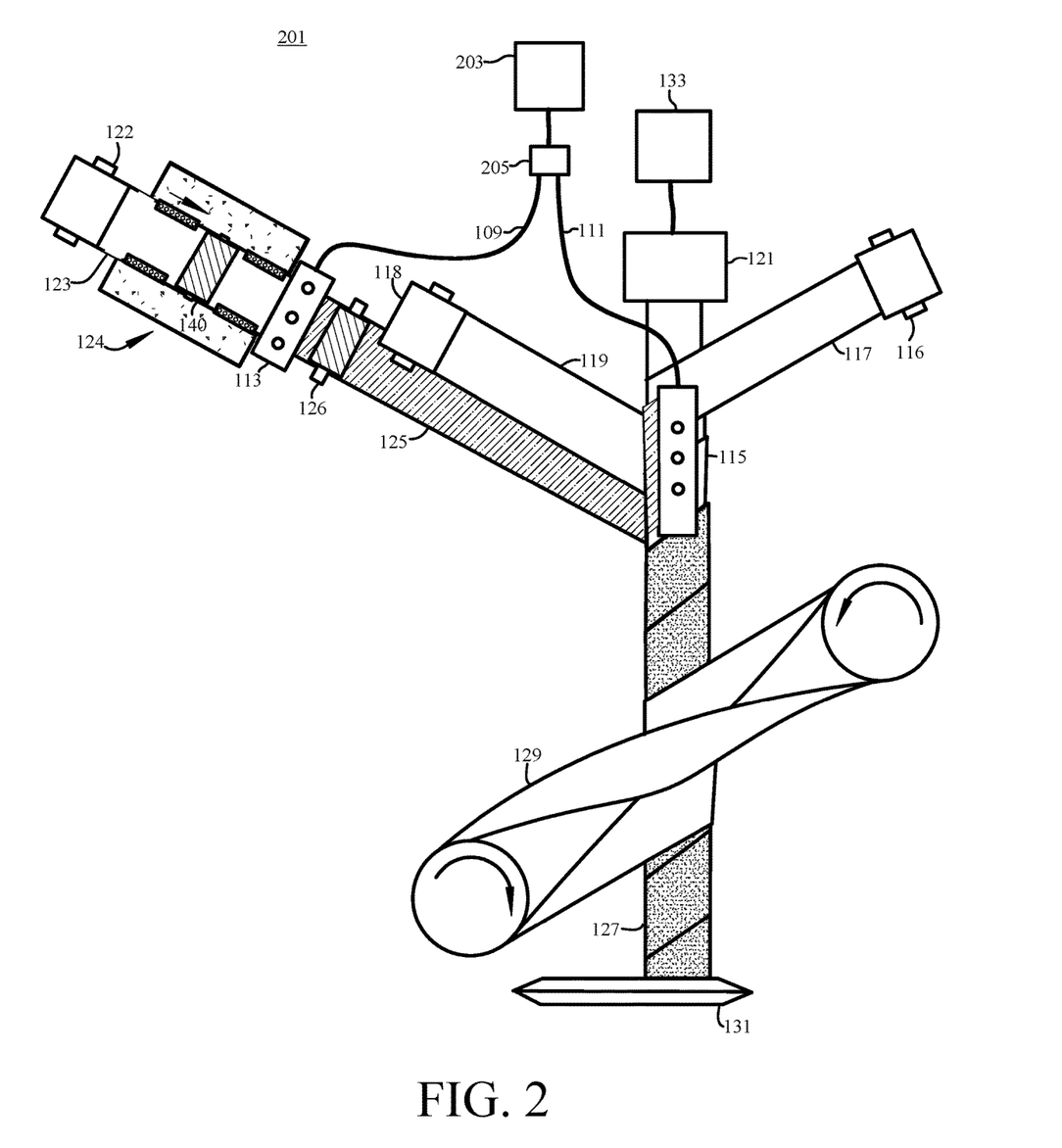
FIG. 2 shows a top view illustrating a machine and process for manufacturing paint rollers in accordance with an embodiment wherein a diversion device is used to direct flow of molten material to two applicators in a two-strip process.

FIG. 2 shows an alternative embodiment of a paint roller manufacturing system 201 wherein a diversion device is used to direct flow of molten material to two applicators. This embodiment operates generally as described above with respect to FIG. 1, except that an extruder 203 feeds molten material to a diversion device 205, which in turn directs a portion of the molten material from extruder 203 to hose 109 and a portion of material to hose 111. The diversion device 205 may be a fixed valve, variable valve, gear pump, Y-adapter, or any other device which can split a flow from an extruder between two die heads. In embodiments where a variable diversion device is used, it may be manually variable to control the proportion of the molten material fed to hose 109 and the proportion of the molten material fed to tube hose. Alternatively, the diversion device may be a dynamically controlled diversion device that sets such proportions according to conditions or variables of the process. Such conditions and variables include, e.g., temperature, viscosity of the molten material, and the particular compound of the adhesive being used. In an embodiment, diverted flow rates of the diversion device 205 are computationally derived. In an embodiment, downstream diverted flow rates of the diversion device 205 are measured and used to control the amount of diversion into each of the hoses 109, 111.

Figure 3:
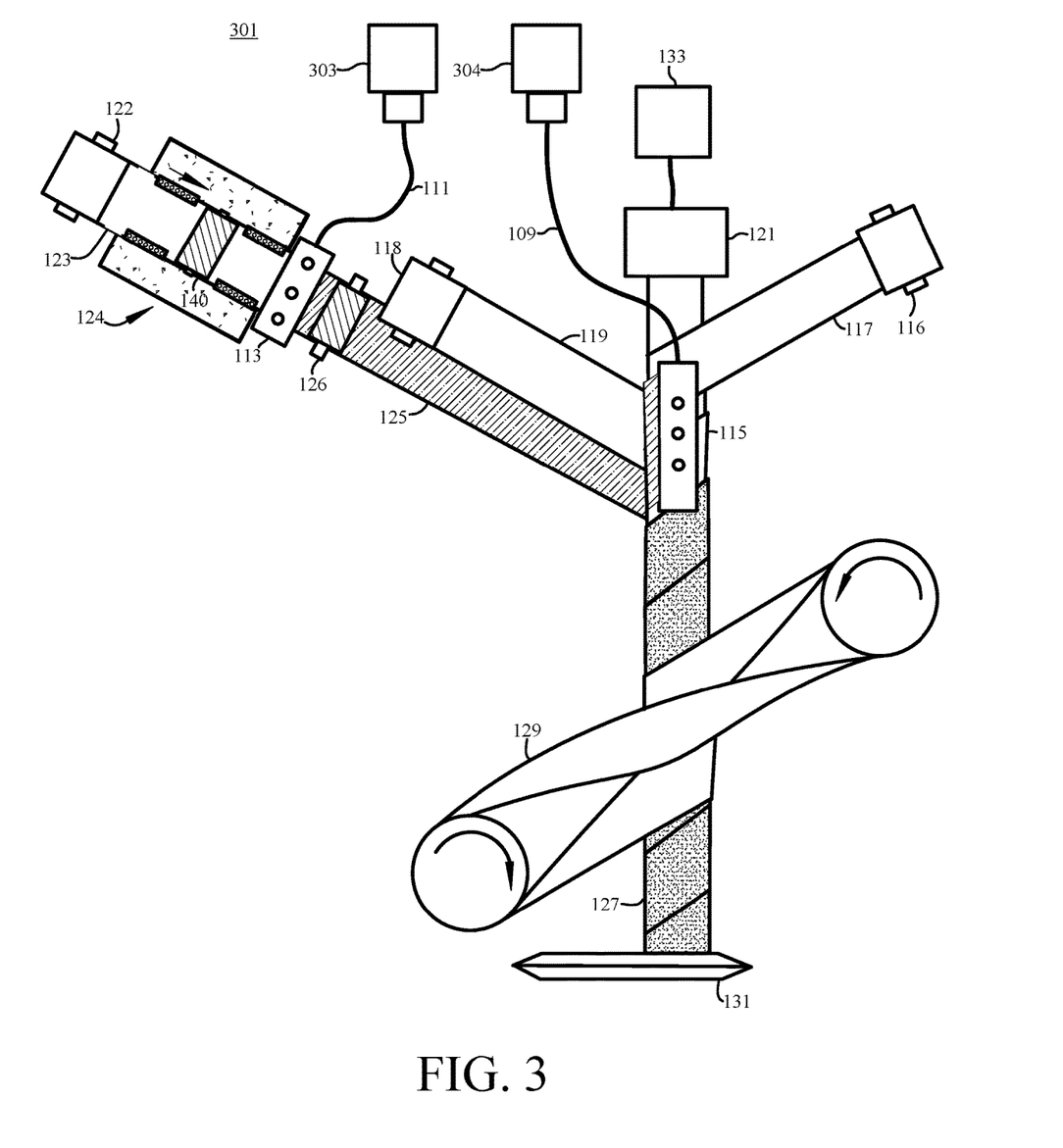
FIG. 3 shows a top view illustrating a machine and process for manufacturing paint rollers in accordance with an embodiment wherein two separate extruders are used to feed two respective applicators in a two-strip process.

FIG. 3 shows an alternative embodiment of a paint roller manufacturing system 301 wherein dual extruders 303 and 304 are used to supply molten material to two applicators 113 and 115, respectively, via hoses 109 and 111. In this manner, different adhesives or compounds of adhesives may be used to feed the two applicators, with a cover adhesive being used in extruder 303 and a strip adhesive being used in extruder 304. This embodiment otherwise operates in a similar manner as described above with reference to FIG. 1.

The methods above are described in the context of a two-strip process for manufacturing paint rollers. One skilled in the art will recognize that the same or similar methods can be used in a single-strip process, a three-strip process, or the like without departing from the spirit and scope of the invention.

Figure 4:
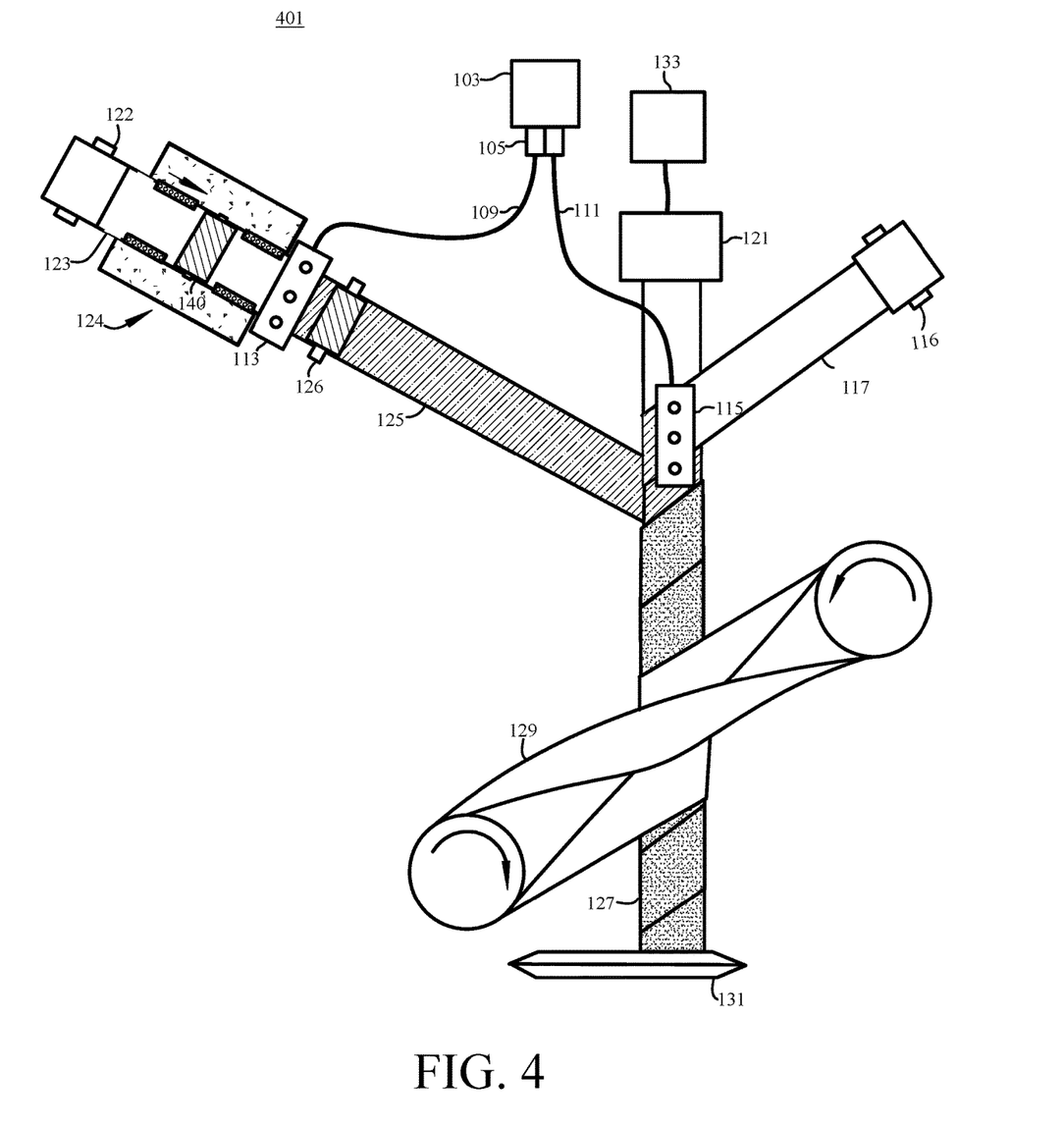
FIG. 4 shows a top view illustrating a machine and process for manufacturing paint rollers in accordance with an embodiment wherein a single extruder is used to feed two applicators in a single-strip process.
Figure 5:
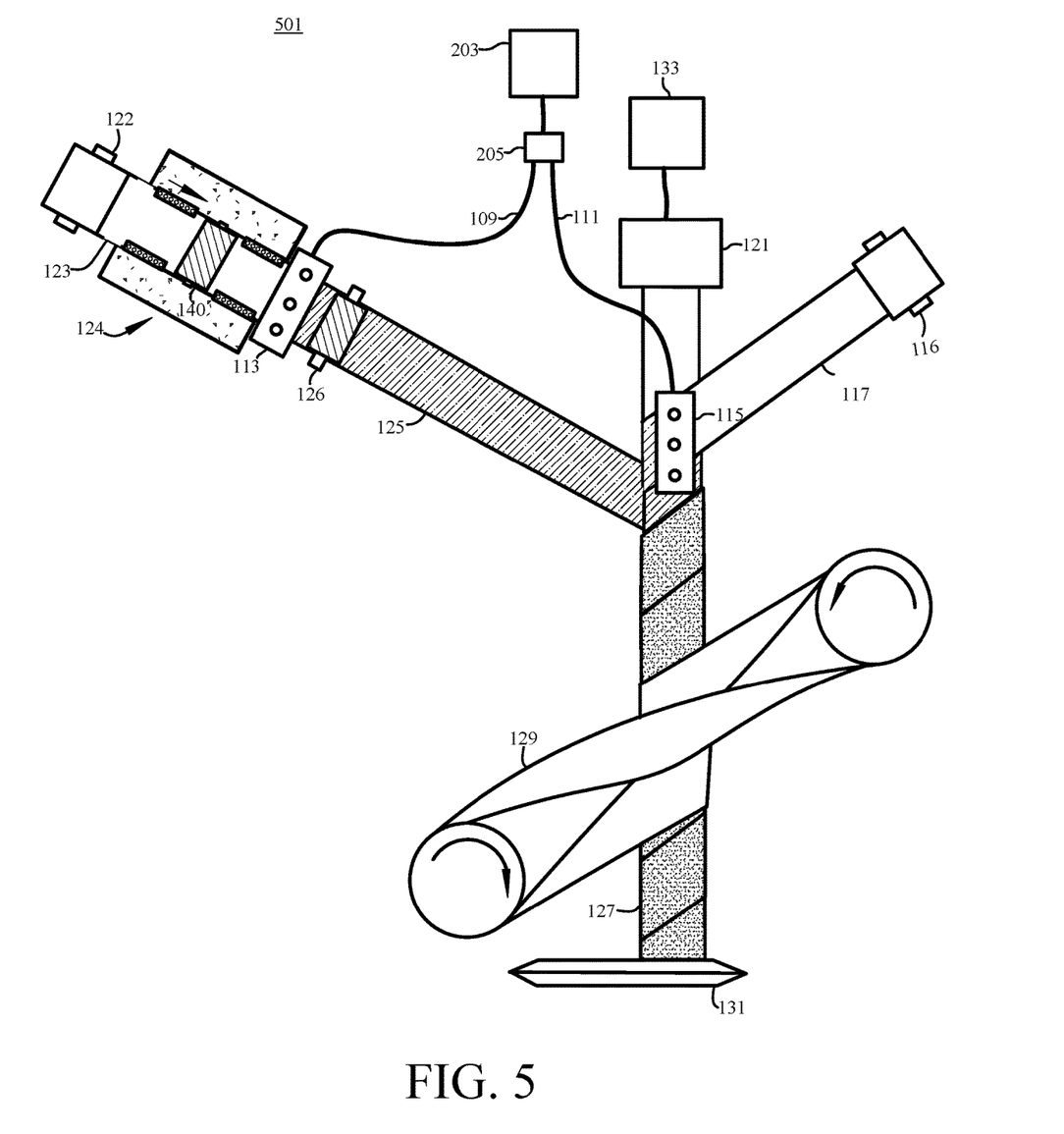
FIG. 5 shows a top view illustrating a machine and process for manufacturing paint rollers in accordance with an embodiment wherein a diversion device is used to direct flow of molten material to two applicators in a single-strip process.
Figure 6:
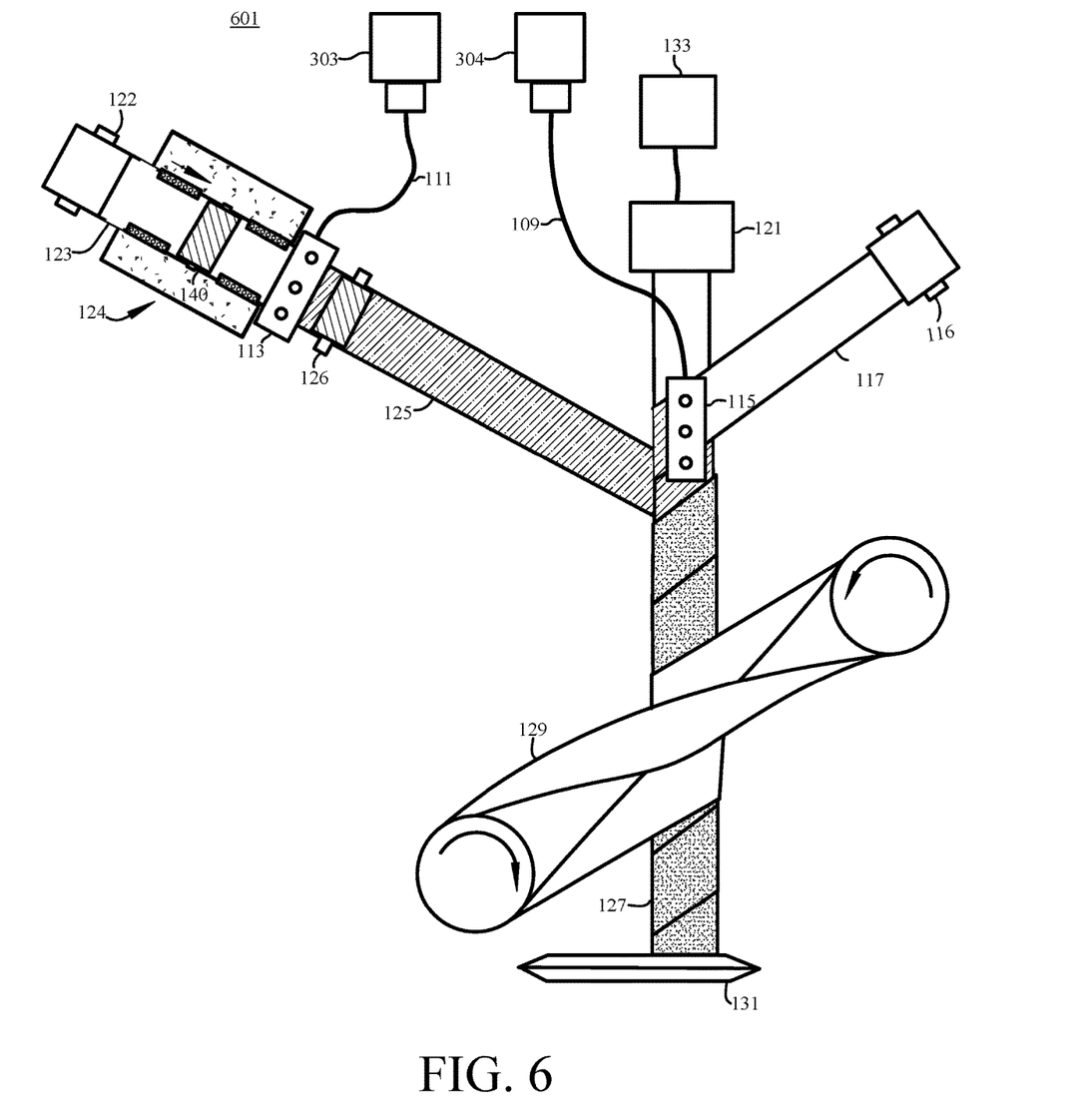
FIG. 6 shows a top view illustrating a machine and process for manufacturing paint rollers in accordance with an embodiment of the invention wherein two separate extruders are used to feed two respective applicators in a single-strip process.

FIG. 4 shows single-strip embodiments 401 of the two-strip machine and process shown in FIG. 1. FIG. 5 shows single-strip embodiments 501 of the two-strip machine and process shown in FIG. 2. FIG. 6 shows single-strip embodiments 601 of the two-strip machine and process shown in FIG. 3. These embodiments generally operate as per the descriptions of FIGS. 1, 2, and 3 above, except that a single strip 117 is used instead of the dual strips 117 and 119. In an embodiment, a mesh layer is applied to the strip 117 before or after adhesive is applied by applicator 115.

In an embodiment of the two-strip machine and process shown in FIGS. 1, 2 and 3 above, a mesh layer may be wound between the inner strip and the outer strip. In an embodiment, a mesh layer may be wound between the outer strip and the coated fabric. In an embodiment, the mesh layer may be aligned (i.e., not in offset relation) with the strip below it (i.e., closer to the mandrel). In an embodiment, the mesh layer may be aligned with the strip above it (i.e., farther from the mandrel). In an embodiment, the mesh layer may be in offset relation to the strip below it. In an embodiment, the mesh layer may be in offset relation to the strip above it. In an embodiment, the mesh layer, the inner strip and the outer strip are each in offset relation to each other.

Advantages of the present invention over the present inventor's prior patents include, but are not limited to the following. It should be noted that some but not all embodiments of the present invention provide each of these advantages. The present invention can provide a single-step in-line process for manufacturing a paint roller using coated fabric, rather than a two-step offline process, thereby reducing the amount of time and waste materials required. Machines operating according to the present invention can be configured to use less adhesive material. Machines in accordance with the present invention can be configured to use an adhesive for the cover material which is formulated differently than the adhesive used for the strip material. Machines and processes in accordance with the present invention have the potential to reduce fabric "shedding," or at least the potential to create a stronger bond between the fabric and the rest of the roller core, i.e. the strip(s) and the resin used for binding.

Reference in this specification to "an embodiment" or "the embodiment" means that a particular feature, structure, or characteristic described in connection with the embodiment is included in at least an embodiment of the disclosure.

The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, and especially within the claims, ordinal terms such as first and second are not intended, in and of themselves, to imply sequence, time or uniqueness, but rather are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A method for using a perforated fabric in a paint roller manufacturing process, comprising:
   using a fabric-coating applicator to apply a fabric adhesive onto a portion of a perforated paint roller cover fabric material having a plurality of perforations through which adhesive may flow, and into the plurality of perforations and into interstitial spaces of the fabric material, to yield a length of coated fabric;
   winding an inner strip and an outer strip about a mandrel in offset relation;
   using a strip-coating applicator to apply a strip adhesive to at least a portion of the outer strip as it is wound about the mandrel;
   simultaneously with the step of applying the strip adhesive to the outer strip, receiving a portion of the coated paint roller fabric material at the outer strip and winding the length of coated fabric about at least the outer strip to form a paint roller tube;
   applying compression to the paint roller tube; and,
   cutting the paint roller tube into like lengths.

2. The method for using a perforated fabric in a paint roller manufacturing process according to claim 1, wherein the fabric adhesive comprises a resin having polypropylene compounded with a filler.

3. The method for using a perforated fabric in a paint roller manufacturing process according to claim 2, wherein the filler comprises calcium carbonate.

4. The method for using a perforated fabric in a paint roller manufacturing process according to claim 3, wherein the resin comprises 10-66% CaCO3 by weight.

5. The method for using a perforated fabric in a paint roller manufacturing process according to claim 4, wherein a polypropylene used in the resin has a melt flow rate that ranges from 900 to 1300 g/10 min.

6. The method for using a perforated fabric in a paint roller manufacturing process according to claim 1, wherein the step of using a fabric-coating applicator to apply a fabric adhesive is performed offline from the paint roller manufacturing process.

7. The method for using a perforated fabric in a paint roller manufacturing process according to claim 1, wherein the step of using a fabric-coating applicator to apply a fabric adhesive is performed online with the paint roller manufacturing process.

8. The method for using a perforated fabric in a paint roller manufacturing process according to claim 1, wherein the perforated fabric has a backing with a thickness of 0.30 inches to 0.50 inches.

9. The method for using a perforated fabric in a paint roller manufacturing process according to claim 8, wherein the step of using a fabric-coating applicator yields a coated fabric having an adhesive that has penetrated to a depth of not more than the thickness of the fabric backing.

10. The method for using a perforated fabric in a paint roller manufacturing process according to claim 1, wherein fabric adhesive comprises an uncompounded polypropylene resin having an effective melt flow rate of 20-140 g/10 min.

* * * * *